US011973255B2

(12) United States Patent
Li et al.

(10) Patent No.: US 11,973,255 B2
(45) Date of Patent: Apr. 30, 2024

(54) CROSS-COUPLED FILTER

(71) Applicants: PROSE TECHNOLOGIES (SUZHOU) CO., LTD., Suzhou (CN); PROSE TECHNOLOGIES LLC, Mount Olive, NJ (US)

(72) Inventors: Dunrong Li, Suzhou (CN); Renhu Luo, Suzhou (CN); Ze Yin, Suzhou (CN); Qiang Li, Suzhou (CN)

(73) Assignees: PROSE TECHNOLOGIES (SUZHOU) CO., LTD., Suzhou (CN); PROSE TECHNOLOGIES LLC, Mount Olive, NJ (US)

( * ) Notice: Subject to any disclaimer, the term of this patent is extended or adjusted under 35 U.S.C. 154(b) by 98 days.

(21) Appl. No.: 17/665,736

(22) Filed: Feb. 7, 2022

(65) Prior Publication Data

US 2022/0181759 A1 Jun. 9, 2022

Related U.S. Application Data

(63) Continuation of application No. PCT/CN2019/099392, filed on Aug. 6, 2019.

(51) Int. Cl.
*H01P 1/208* (2006.01)
*H01P 1/205* (2006.01)

(52) U.S. Cl.
CPC ............ *H01P 1/208* (2013.01); *H01P 1/2053* (2013.01)

(58) Field of Classification Search
CPC ........ H01P 1/208; H01P 1/2053; H01P 1/205; H01P 1/207; H01P 1/201; H01P 1/202; H01P 1/203; H01P 1/20327; H01P 1/20336
See application file for complete search history.

(56) References Cited

U.S. PATENT DOCUMENTS 11,799,181 B2 * 10/2023 Li .......................... H01P 1/2086
2010/0117768 A1 5/2010 Chuang et al.

FOREIGN PATENT DOCUMENTS

CN 202678485 U 1/2013
CN 103035989 A 4/2013
CN 106898849 A 6/2017
CN 107196023 A 9/2017
(Continued)

OTHER PUBLICATIONS

World Intellectual Property Organization (WIPO) International Search Report for PCT/CN2019/099392 dated Apr. 24, 2020 7 pages (with translation).

*Primary Examiner* — Stephen E. Jones
(74) *Attorney, Agent, or Firm* — ANOVA LAW GROUP, PLLC

(57) ABSTRACT

A cross-coupled filter includes a minimum resonant structure including four resonators. In the minimum resonant structure, two resonators in the same row form a group, and two resonators in the same row are capacitively mainly coupled or inductively mainly coupled; two resonators in the same column are electrically and magnetically hybrid coupled; and the coupling polarities of the two groups of resonators in the two rows of resonant units are opposite to each other and form at least a cross-coupling. The invention realizes miniaturization and light weight in structural characteristics, and realizes low loss and good harmonic characteristics in electrical performance.

18 Claims, 15 Drawing Sheets

(56) References Cited

FOREIGN PATENT DOCUMENTS

| | | | |
|---|---|---|---|
| CN | 108987865 | A | 12/2018 |
| CN | 208272091 | U | 12/2018 |
| CN | 109950669 | A | 6/2019 |
| CN | 110556616 | A | 12/2019 |
| CN | 111446524 | A | 7/2020 |

* cited by examiner

CROSS-COUPLED FILTER

CROSS-REFERENCE TO RELATED APPLICATION

This application is a continuation application of PCT application PCT/CN2019/099392, filed on Aug. 6, 2019, the entire content of which is incorporated herein by reference.

FIELD OF THE DISCLOSURE

The present disclosure relates to a filter, and in particular to a cross-coupled filter.

BACKGROUND

Recently, there is a demand for and a trend towards miniaturization and high-quality requirements of a filter. In particular, the communication components used in small base stations for 5G communications are smaller in size and more in demand than previous macro base station products. Therefore, the components used in the products must also be high-quality, miniaturized, lightweight, and have a structure suitable for mass production.

Currently, the filter used in small base stations is usually a dielectric waveguide filter or a traditional metal coaxial filter. The dielectric waveguide filter can be miniaturized and lightweight, and has a low manufacturing cost, but has worse loss and harmonic characteristics compared to the metal coaxial filter. The traditional metal coaxial filter has better loss and harmonic characteristics compared to the dielectric waveguide filter, but the reduction in size and weight of the design characteristics has reached a certain limit, and the number of internal components has also reached the limit, which cannot achieve the purpose of reducing manufacturing cost.

Therefore, it is necessary to propose a new type of miniaturized and lightweight filter to solve the degradation of the insertion loss and the degree of suppression of the electrical performance of the above-mentioned filter, the possibility of deformation during die-casting, the need for the second harmonic improvement and other issues.

SUMMARY

The purpose of the present disclosure is to overcome the defects of the prior art and provide a cross-coupled filter.

In order to achieve the above objective, the present disclosure provides the following technical solution: a cross-coupled filter that includes a resonant structure including at least two rows of resonant units and at least two columns of resonant units, each row of resonant units and each row of resonant units includes at least two resonators respectively. Two first adjacent resonators in a first row of the two adjacent rows of resonant units and two second adjacent resonators in a second row of the two adjacent rows of resonant units respectively in the same columns as the two first adjacent resonators form a minimum resonant structure. In the minimum resonant structure, two resonators in the same row form a group, and the two resonators in the same row are capacitively mainly coupled or inductively mainly coupled; the two resonators in the same column are electrically and magnetically hybrid coupled; and the coupling polarities of the two groups of resonators of the two rows of resonant units are opposite to each other to form at least a cross-coupling; and the coupling polarity includes capacitive main coupling or inductive main coupling.

In some embodiments, in the resonant structure, two adjacent resonators in the same row are capacitively mainly coupled or inductively mainly coupled; two adjacent resonators in the same column are electrically and magnetically hybrid coupled, and the coupling polarities of the adjacent two groups of resonators in the same row are opposite to each other to form at least a cross-coupling; and/or the coupling polarities of the adjacent two groups of resonators in two adjacent rows are opposite to each other to form at least a cross-coupling.

In some embodiments, a plurality of rows of the resonant units are located on the same plane or arranged in layers.

In some embodiments, each resonator includes a resonant head and a resonant tail disposed opposite to each other, and a width of the resonant head is greater than a width of the resonator tail.

In some embodiments, the resonant tails of two adjacent resonators in the same row are connected or placed face-to-face to form an inductive main coupling; or the resonant heads are opposed (placed face-to-face) to form a capacitive main coupling. Two adjacent resonators in the same column are arranged in parallel or approximately parallel, and an electrical and magnetic hybrid coupling is formed between two adjacent resonators in the same column.

In some embodiments, the two adjacent groups of resonators in two adjacent rows are distributed in the form of alternating the capacitive main coupling or the inductive main coupling, such that the coupling polarities of the adjacent two groups of resonators in two adjacent rows are opposite to each other, and/or a plurality of groups of resonators in the same row are distributed in the form of alternating the capacitive main coupling or the inductive main coupling, such that the coupling polarities of the adjacent two groups of resonators in the same row are opposite to each other. In other words, coupling polarities of two adjacent groups of resonators in two adjacent rows alternate between capacitive main coupling and inductive main coupling; and/or coupling polarities of a plurality of groups of resonators in the same row alternate between capacitive main coupling and inductive main coupling.

In some embodiments, the resonant structure is integrally formed, or at least two resonators of the resonant structure are integrally formed.

In some embodiments, the resonant structure further comprises a frame, and the resonant units are integrally formed or assembled on the frame.

In some embodiments, the filter further comprises a cover arranged on the resonant structure, the cover comprises a plurality of protrusions and at least one shielding wall, wherein, the protrusion is formed by extending from an end face of the cover close to the resonant structure toward the resonant structure, and positions of the protrusions arranged on the cover correspond to positions of the resonant heads of the resonators on the resonant structure; and the shielding wall is located between two adjacent resonators.

In some embodiments, the cross-coupled filter further comprises at least one structural member configured to enhance an amount of cross-coupling between the resonators, and the structural members is configured to connect two resonators that form the cross-coupling.

In some embodiments, the filter further comprises a plurality of tuning screws, each located above a corresponding resonator and configured to adjust a resonant frequency of the corresponding resonator; and a plurality of coupling adjustment screws, each located between two adjacent resonators and configured to adjust an amount of coupling between the two adjacent resonators.

In some embodiments, the plurality of rows of resonant units are distributed along a signal transmission path, and the signal transmission path is a U-shaped or S-shaped or a curved path formed by one or more continuous U-shapes or continuous S-shapes.

In some embodiments, the filter further includes a signal input port and a signal output port respectively arranged at the two ends of the signal transmission path.

In some embodiments, the filter is a fourth-order or above fourth-order filter.

The beneficial effects of the present disclosure are:

1. the advantages of dielectric waveguide filters and metal coaxial filters are integrated as much as possible to achieve miniaturization and light weight in terms of structural characteristics, and achieve low loss and good harmonic characteristics in terms of electrical performance. In addition, the number of components inside the filter is minimized as much as possible, which reduces the production cost and simplifies the production process to be suitable for mass production.

2. a plurality of rows of resonant units arranged in layers or in a single layer are adopted, and the cross-coupling between each row is increased, which can strengthen the amount of coupling between resonant units in rows, and the interdigital coupling and the coupling polarity opposite to the main channel are used to generate transmission zero points, which can realize the miniaturized design of the filter and improve the loss.

3. the resonant structure of the filter adopts an integrated frame structure, which is easy to assemble and has good assembling tolerance consistency, such that the product quality of the filter can be maintained stably.

4. adjustment of the amount of coupling on the cavity and improvement of the shielding structure for harmonics can reduce the size of the resonator, realize the miniaturization of the filter, improve the Q value of the resonator, and reduce loss and other filtering characteristics.

Figure 18A:
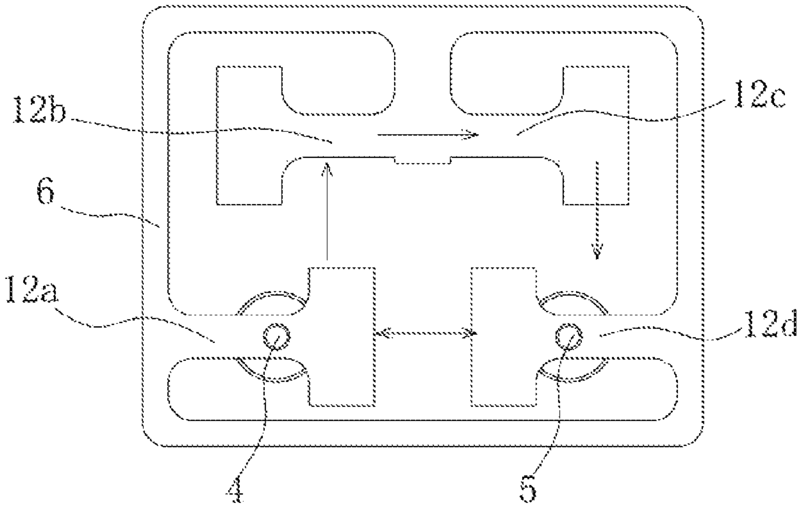

FIG. **18*a*** is a structural diagram of a fourth-order filter according to some embodiments of the present disclosure;

FIG. **18*b* is a structural diagram of a minimum resonant structure A of the filter shown in FIG. 18*a*;**

FIG. **18*c* is a simulated waveform diagram of the fourth-order filter shown in FIG. 18*a*;**

FIG. **19*a*** is an exploded view of a filter according to embodiment 9 of the present disclosure;

FIG. **19*b*** is a structural diagram of a resonant structure of the filter according to embodiment 9 of the present disclosure;

FIG. **19*c*** is a simulated waveform diagram of the filter according to embodiment 9 of the present disclosure;

REFERENCE NUMERALS

1. resonant structure; 12 and **12*a*-12*h*. resonator; 121. resonant head; 122. resonant middle portion; 123. resonant tail; 2. first cover; 21. protrusion; 22. recess; 23. shielding wall; 24. connecting post; 3. second cover; 4. signal input port; 5. signal output port; 6. frame; 61. partition wall; 62. coupling window; S1. transmission loss waveform; S2. return loss waveform; A. minimum resonant structure; 7. tuning screw; 8**. coupling adjustment screw.

DETAILED DESCRIPTION

The technical solutions of the embodiments of the present disclosure will be clearly and completely described below in conjunction with the accompanying drawings of the present disclosure.

Figure 1:
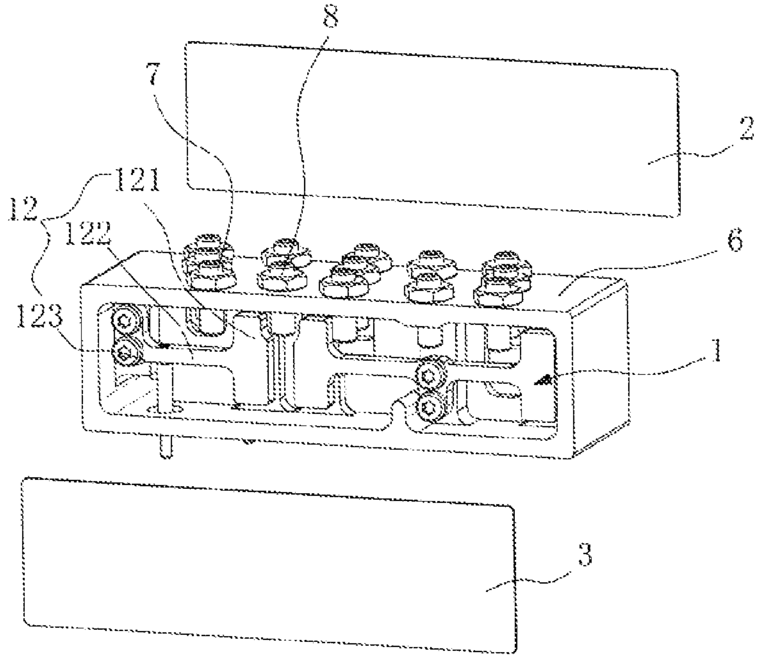
FIG. 1 is a structural diagram of an example filter according to embodiment 1 of the present disclosure.
Figure 12:
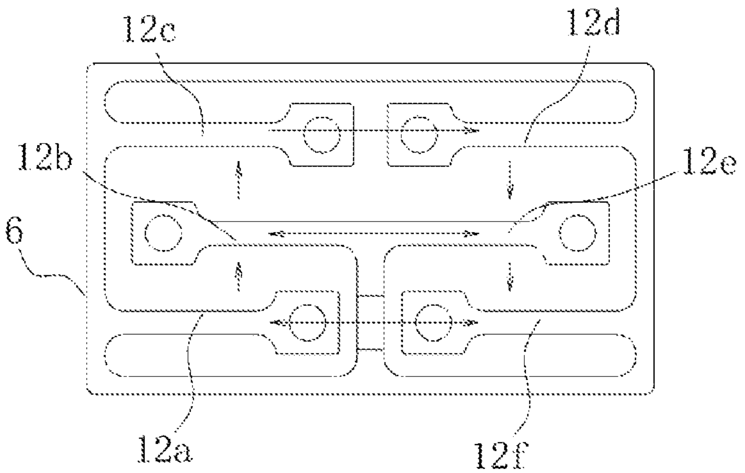
FIG. 12 is a structural diagram of a resonant structure of the filter according to embodiment 7 of the present disclosure.
Figure 17:
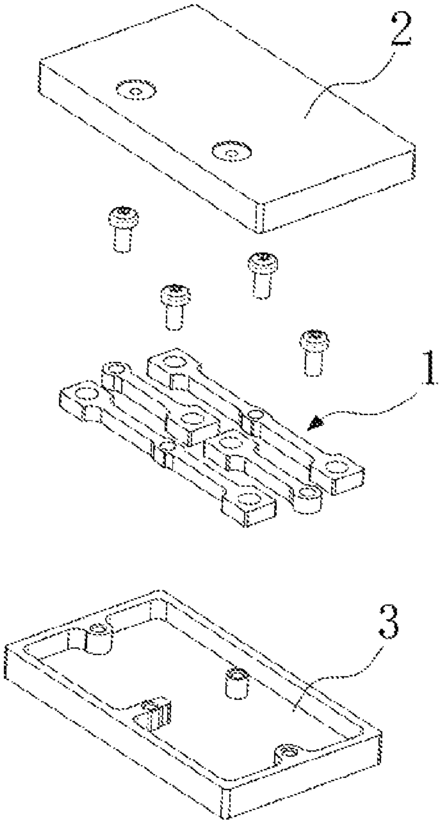
FIG. 17 is an exploded view of an alternative structure of a resonant structure according to some embodiments of the present disclosure.

As shown in FIG. 1, the cross-coupled filter disclosed in the present disclosure includes a resonant structure 1, the resonant structure 1 specifically includes a plurality of rows of resonant units and a plurality of columns of resonant units. Each row of resonant units and each column of resonant units include a plurality of resonators 12 respectively. During implementation, as shown in FIG. 12, the resonant structure 1 can be formed integrally using the integrated framework (that is, the resonators integrated with the frame 6), the frame-integrated resonant structure 1 has the advantages of simple assembly, good assembly tolerance consistency, and stable product quality. The resonant structure 1 may also be a separate structure without a frame, as shown in FIGS. 1 and 17, a plurality of rows of resonant units of the resonant structure 1 are fixed in a frame 6 respectively (for example, by fixing members such as screws).

Figure 2:
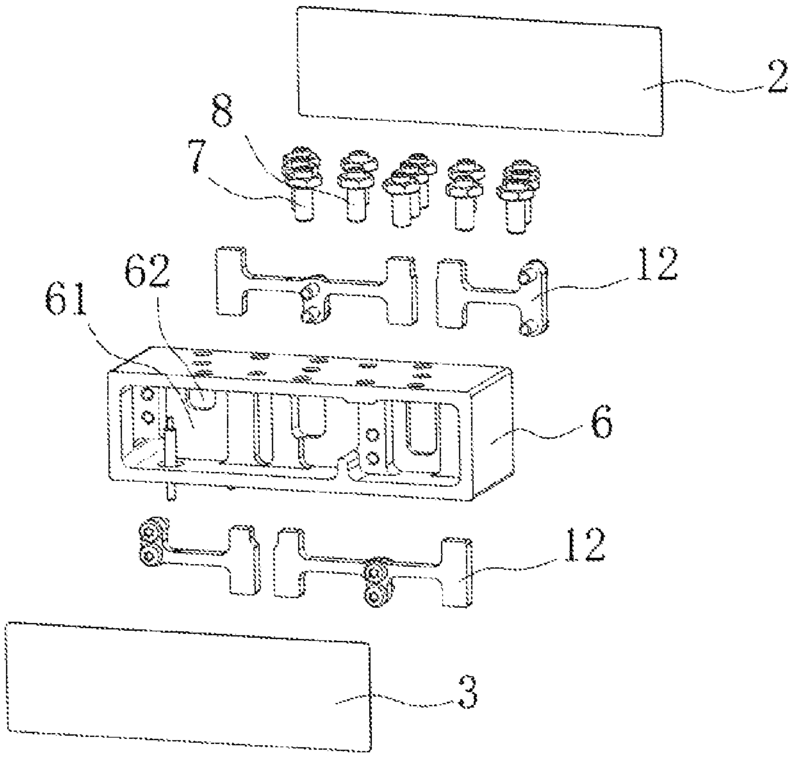
FIG. 2 is an exploded view of the filter shown in FIG. 1.

In addition, when implemented, the plurality of rows of resonant units of the resonant structure 1 can be located on the same plane, that is, on the same layer, and this structure can greatly reduce the size of the filter in the height direction. It is also possible to arrange the plurality of rows of resonant units in layers, that is, the plurality of rows of resonant units are not located on the same plane. As shown in FIGS. 1 and 2, each row of resonant units is vertically fixed in the frame 6, and the plurality of rows of resonant units are arranged in parallel in the longitudinal direction in the frame 6 (that is, along the front-rear direction of the frame 6); as shown in FIGS. 6, 9, 10, and 15, a plurality of rows of resonant units are located on the same plane.

Figure 5:
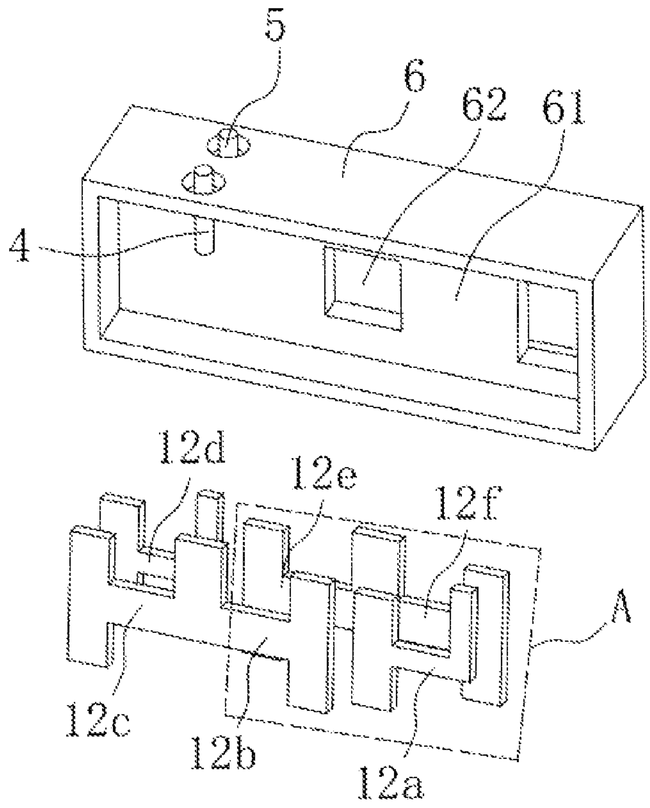
FIG. 5 is a structural diagram of a filter according to embodiment 2 of the present disclosure.
Figure 8:
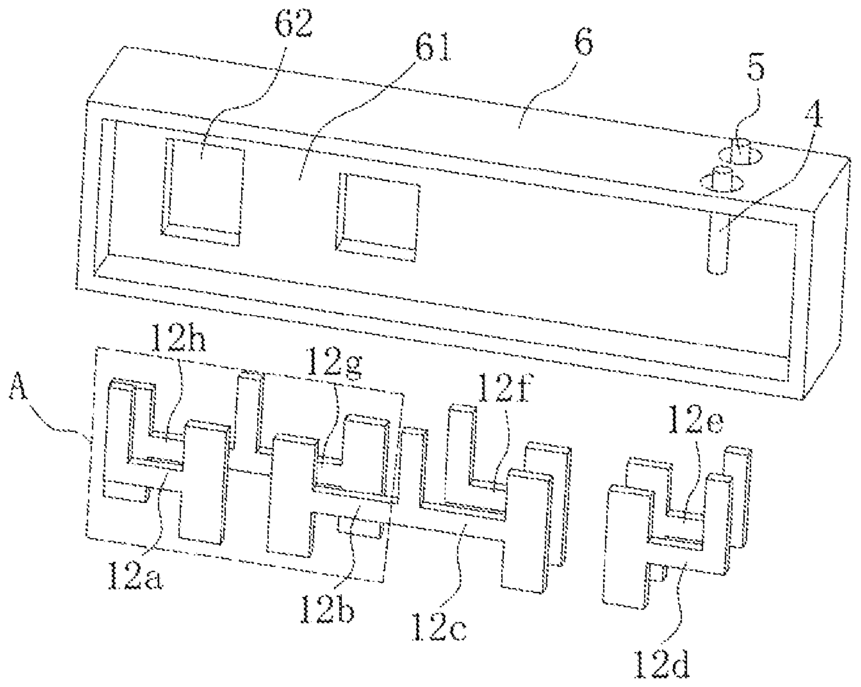
FIG. 8 is a structural diagram of a filter according to embodiment 5 of the present disclosure.
Figure 9:
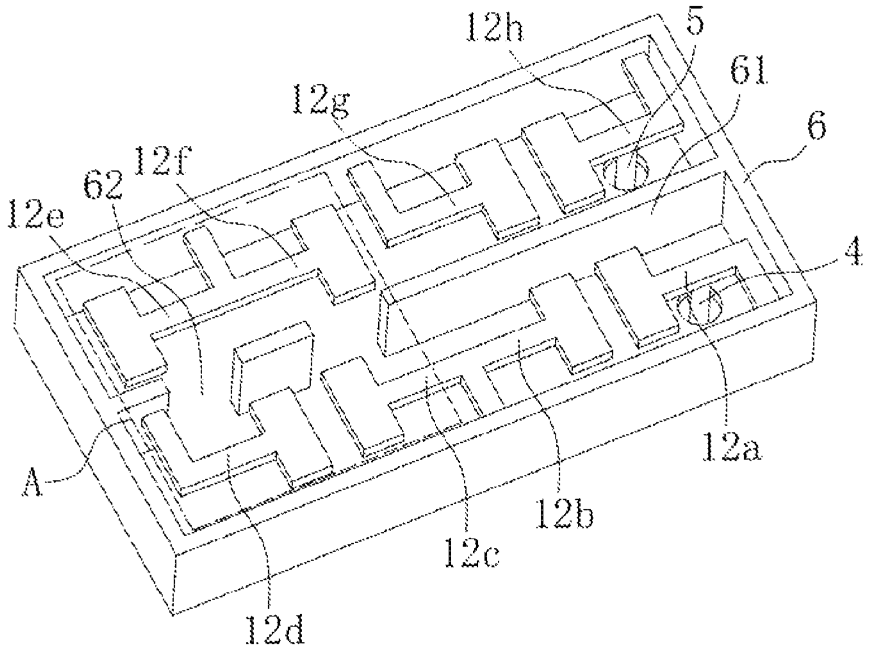
FIG. 9 is structural diagram of a filter according to embodiment 6 of the present disclosure.

As shown in FIGS. 5, 8, and 9, the minimum resonant structure A formed by the filter of the present disclosure is a fourth-order filter, specifically, the minimum resonant structure A includes two rows of adjacent resonant units and two columns of adjacent resonant units, wherein each row of resonant units and each column of resonant units have two resonators respectively. During implementation, the filter can be directly the minimum resonant structure A, that is, the filter is a fourth order filter, or the minimum resonant structure A is formed in other filters with more than 4 resonators (such as 6 resonators, 8 resonators, etc.) and position thereof in the filter is not limited, specifically, two adjacent resonators in any one row of resonant units of the two adjacent rows of resonant units and two adjacent resonators in another row of resonant units of the two adjacent rows of resonant units which are in the same column form a minimum resonant structure.

During implementation, in addition to the minimum resonant structure A, the present disclosure may not limit the coupling polarity, arrangements, etc. of the other resonators 12 in the filter.

In addition, the shape design of the resonator 12 and arrangement thereof in the frame 6 determine the coupling mode between the resonators 12. In this embodiment, as shown in FIG. 1, each resonator 12 has a cylindrical structure as a whole, and specifically includes a resonant head 121, a resonant middle portion 122, and a resonant tail 123, wherein the resonant head 121 is the portion of the resonator 12 having the strongest electrical coupling strength, while the resonant tail 123 is the portion of the resonator 12 having the strongest magnetic coupling strength. In some embodiments, the width of the resonant head 121 is designed to be wider than the widths of the resonant middle portion 122 and the resonant tail 123, so that the size of the resonator 12 can be further reduced under the requirement of the same frequency. Of course, the resonator structure with a plurality of bendings is also applicable to the present disclosure.

The plurality of rows of resonators 12 are arranged in the frame 6 along a signal transmission path, the signal transmission path may be U-shaped or S-shaped, or a curved path formed by a plurality of continuous U-shapes or S-shapes. The coupling mode between two adjacent resonators 12 along the signal transmission path is determined by their shapes and mutual arranged positions.

What needs to be explained is that the coupling of the general TEM (transverse electromagnetic mode) filter is a coexisting of capacitive coupling and inductive coupling, when the amount coupling of one of these two types of coupling is larger than that of the other type of coupling, the one of these two types of coupling with a large coupling amount is called the dominant coupling. The dominant coupling mode in the filter of the present disclosure can be determined by the arranged position of the two coupled resonators. If the coupling between the two coupled resonators is dominantly generated by the resonant head, the dominant coupling is referred as capacitive main coupling or negative main coupling. If the coupling between the two coupled resonators is dominantly generated by the resonant tail, the dominant coupling is referred as inductive main coupling or positive main coupling. If the difference between the amount of the electrical coupling between the two coupled resonators and the amount of the magnetic coupling between the two coupled resonators is slight, the coupling between the two coupled resonators is referred as electrical and magnetic hybrid coupling. Further, as used herein, coupling polarities of two groups of resonators being opposite to each other refers to a situation where one group of resonators are capacitively mainly coupled and the other group of resonators are inductively mainly coupled.

Among them, when the resonators in the same row are arranged horizontally, and the resonators in the same column are arranged longitudinally, the signal can be transmitted in one of the directions (i.e., horizontal or longitudinal direction) first; when the resonators in the same row are arranged longitudinally, and the resonators in the same column are arranged horizontally, the signal can also be transmitted in one of the directions first.

Figure 18B:
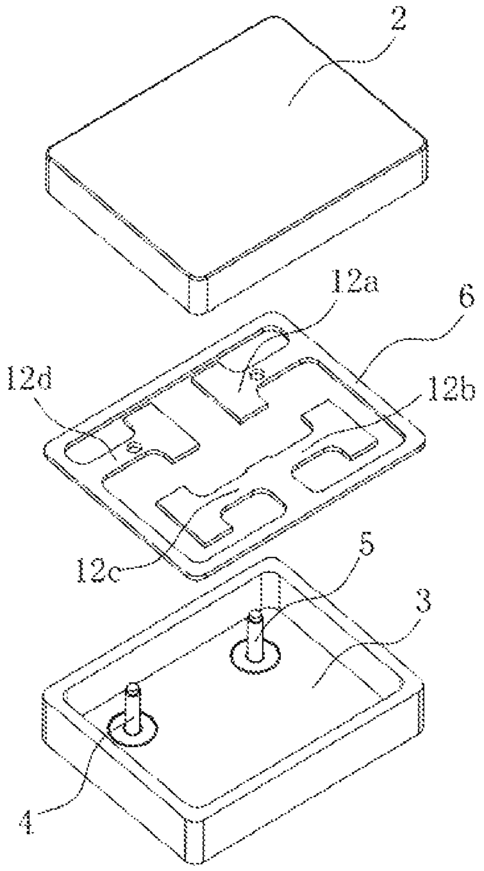

As shown in FIG. 18*a*, the filter which is a fourth-order filter specifically includes a first cover 2, a second cover 3 and a minimum resonant structure A, wherein as shown in FIG. 18*b*, the minimum resonant structure A includes two rows of resonant units and two columns of resonant units, i.e., the minimum resonant structure A includes 4 resonators 12*a*, 12*b*, 12*c*, and 12*d*, at this time, the resonators in the same row are arranged horizontally, the resonators in the column row are arranged longitudinally, and the signal is transmitted in the longitudinal direction first. The two resonators 12 in the same row of the minimum resonant structure A are capacitively mainly coupled or inductively mainly coupled. In the minimum resonant structure A shown in FIG. 18*a*, the resonators 12*a* and 12*d* in the same row are capacitively mainly coupled, and the resonators 12*b* and 12*c* in the same row are inductively mainly coupled.

Figure 18C:
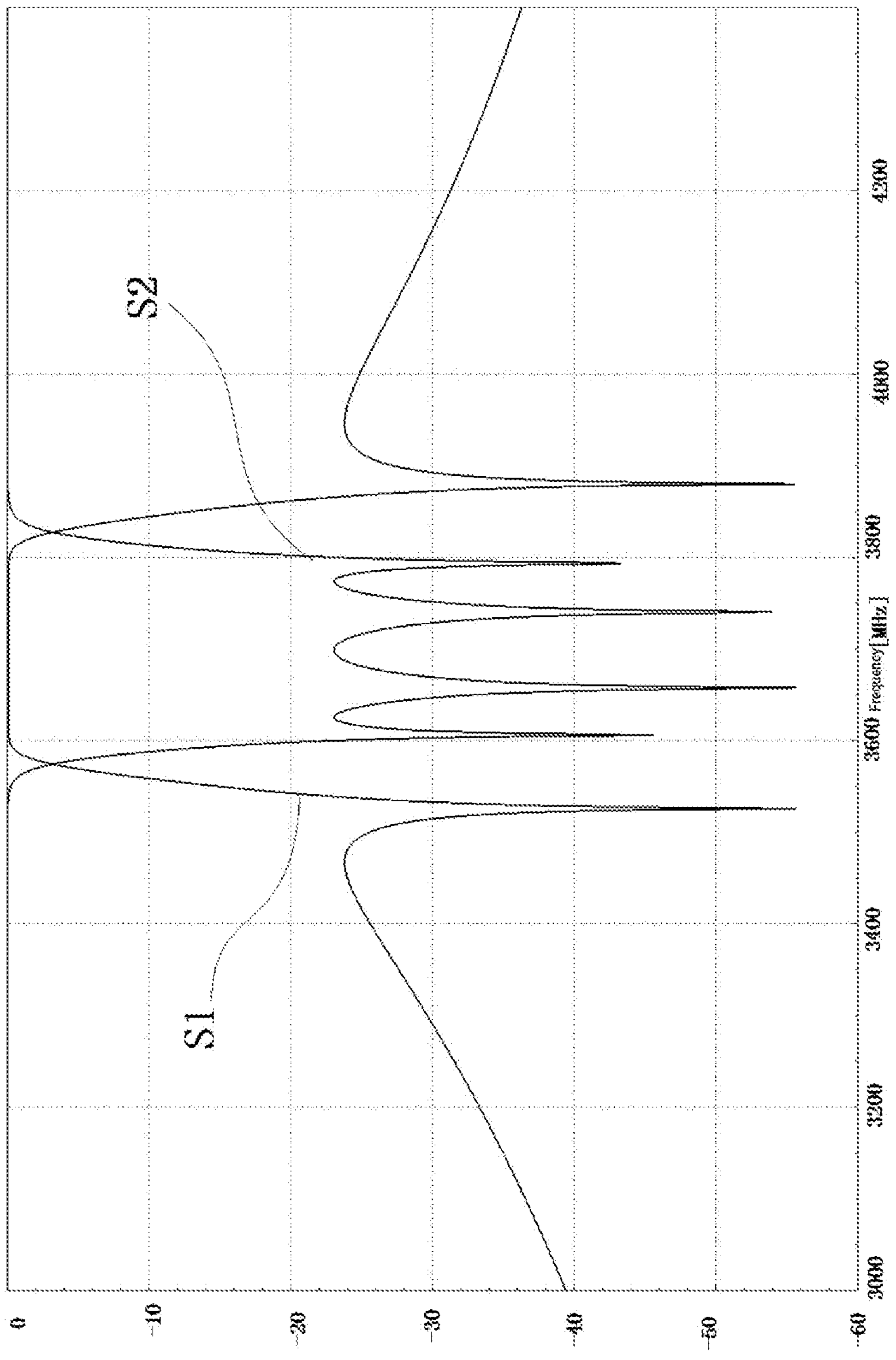

For ease of description, the two resonators 12 in the same row in this embodiment are defined as a group. Two adjacent resonators 12 in the same column are electrically and magnetically hybrid coupled, and the coupling polarities of the two groups of resonators 12 of the two rows of resonant units are opposite to each other. The coupling polarity here includes the above-mentioned capacitive main coupling and inductive main coupling, that is, the coupling polarities of the two groups of resonators 12 of the two rows of resonant units are opposite to each other, the coupling mode of one group is capacitive main coupling, and the coupling mode of the other group is inductive main coupling. In addition, at least one of the two columns of resonators 12 of the two rows of resonant units forms a cross-coupling, as shown in FIG. 18*c*.

As shown in FIGS. 5 and 8-9, in a specific embodiment, the resonators in the same row are arranged horizontally and the resonators in the same column are arranged longitudinally, the signal is transmitted horizontally first, the two resonators 12 in the same row of the minimum resonant structure A are capacitively mainly coupled or inductively mainly coupled, for ease of description, the two resonators 12 in the same row in this embodiment are defined as a group. Two adjacent resonators 12 in the same column are electrically and magnetically hybrid coupled, and the coupling polarities of the two groups of resonators 12 of the two rows of resonant units are opposite to each other. The coupling polarity here includes the above-mentioned capacitive main coupling and inductive main coupling, that is, the coupling polarity of the two groups of resonators 12 of the two rows of resonant units are opposite to each other, the coupling mode of one group is capacitive main coupling, the coupling mode of the other group is inductive main coupling. In addition, at least one of the two columns of resonators 12 of the two rows of resonant units forms a cross-coupling.

Specifically, in this embodiment, the resonant tails 123 of the two resonators 12 in the same row of the minimum resonant structure A are connected or placed face-to-face, or the resonant heads 121 thereof are arranged oppositely, and when the resonant tails 123 are connected or placed face-to-face, the coupling is inductive main coupling; when the resonant heads 121 are arranged oppositely, the coupling formed is capacitive main coupling. Two resonators 12 in the same column are arranged in parallel or substantially parallel, but the orientations of the resonant heads 121 or the resonant tails 123 of the two resonators 12 are placed face-to-face, if the resonant head 121 of one of resonators 12 is oriented to the left, the other resonant head 121 of the other of resonators 12 is oriented to the right, of course, the two resonators 12 in the same column are not limited to the arrangement of the resonators facing the opposite directions, as long as the electrical and magnetic hybrid coupling between the two resonators 12 can be achieved. And the coupling polarities of the two groups of resonators 12 of the two rows of resonant units are opposite to each other, specifically, if the resonant heads 121 of the two resonators 12 (i.e., a group of resonators) in one row are arranged oppositely to form capacitive main coupling, the resonant tails 123 of the two resonators in the other row (that is, the other group of resonators) are connected or placed face-to-face to form inductive main coupling, of course, the two groups of resonators 12 of the two rows of resonant units are not limited to the arrangements mentioned here, as long as the two adjacent groups of resonators of adjacent two rows of resonant units distributed in a form of alternating a capacitive main coupling or a inductive main coupling can be realized.

In addition, the other resonators 12 in the filter can be expanded into a filtering structure having at least two rows and at least two columns of resonators 12 according to the coupling mode between the resonators 12 in this embodiment. Specifically, the two adjacent resonators 12 in the same row are capacitively mainly coupled or inductively mainly coupled; the two adjacent resonators 12 in the same column are electrically and magnetically hybrid coupled, and the coupling polarities of the two adjacent groups of resonators 12 in the same row are opposite to each other and/or the coupling polarities of the two adjacent groups of resonators 12 in two adjacent rows are opposite to each other, and at least a cross-coupling is formed in the plurality of columns of resonators 12 of the plurality of rows of resonant units.

Figure 15:
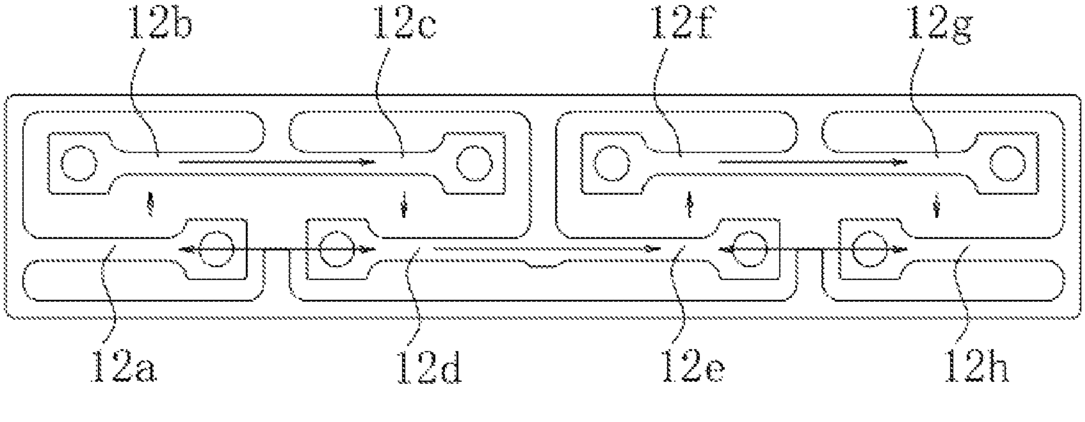
FIG. 15 is a schematic diagram of a resonant structure of the filter according to the embodiment 8 of the present disclosure.

As shown in FIGS. 12 and 15, in another specific alternative embodiment, the resonators in the same row are arranged horizontally, and the resonators in the same column are arranged longitudinally, and the signal is transmitted longitudinally first, and electrical and magnetic hybrid coupling is formed between the two resonators 12 in the same column of the minimum resonance structure A, that is, the amounts of electrical coupling and magnetic coupling of the two adjacent resonators 12 reaches a value that forms an electrical and magnetic hybrid coupling. Capacitive main coupling or inductive main coupling is formed between two adjacent resonators 12 in the same row, for ease of description, the two resonators 12 in the same row in this embodiment are defined as a group. Moreover, the coupling polarities of the two groups of resonators 12 of the two rows of resonant units are opposite to each other. In addition, at least a cross-coupling is formed between the two columns of resonators 12 of the two rows of resonant units.

Specifically, the two resonators 12 in the same column are arranged in parallel or substantially parallel, but the orientations of the resonant heads 121 or the resonant tails 123 of the two resonators 12 are opposite to each other; the resonant tails 123 of the two resonators in the same row are connected or the resonant heads 121 of the two resonators in the same row are arranged oppositely; the arrangement of the two groups of resonators 12 of the two rows of resonant units is the same as the above explanation, and the details will not be repeated here.

Similarly, the other resonators 12 in the filter can also be expanded into a filtering structure having at least two rows and at least two columns of resonators 12 according to the coupling mode between the resonators 12 in this alternative embodiment. Specifically, the two adjacent resonators 12 in the same column are electrically and magnetically hybrid coupled; the two adjacent resonators 12 in the same row are capacitively mainly coupled or inductively mainly coupled, the coupling polarities of the two adjacent group of resonators 12 in the same row are opposite to each other and/or the coupling polarities of the two adjacent groups of resonators 12 in two adjacent columns are opposite to each other, and at least a cross-coupling is formed. The cross-coupling generates transmission zero points around each side of the bandwidth, and according to the number of resonators 12, the number of cross-couplings can be increased to increase the number of zero points. The realization of cross-coupling between the resonators 12 of the present disclosure does not require additional structural components, but according to conditions, additional structural components (such as metal rods, insulators, etc., not shown in the figures) can be added between two adjacent resonators 12 that form cross-coupling to further increase the amount of cross-coupling.

Figure 11:
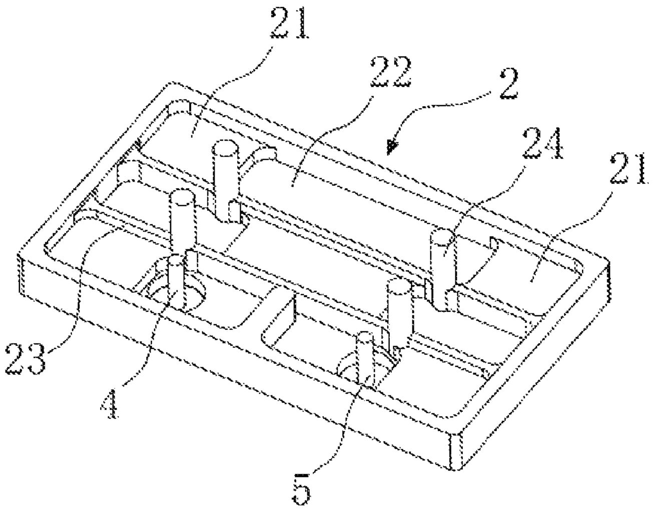
FIG. 11 is a structural diagram of a cover according to some embodiments of the present disclosure.

Further, the filter further includes a cover arranged on the resonant structure, and a closed filtering cavity is formed between the cover and the resonant structure, during implementation, the cover includes a first cover 2 and a second cover 3 respectively covering the end surfaces on both sides of the resonant structure, the structures of the first cover 2 and the second cover 3 are basically the same, the structure of the first cover 2 will be described in detail here, and the structure of the second cover 3 can be understood by referring to the following description of the first cover 2 and not be repeated here. As shown in FIG. 11, the first cover 2 includes a plurality of protrusions 21 arranged on the lower end surface thereof, at least one shielding wall 23, and at least one connecting post 24, the lower end surface here is the side close to the resonance structure 1. The protrusion 21 is formed by extending from the lower end surface of the first cover 2 close to the resonant structure 1, and the arranged position of the protrusion 21 on the first cover 2 is corresponding to the position of the resonant head 121 of the resonator 12, that is, the above-mentioned protrusion 21 is arranged on the lower end surface of the first cover 2 corresponding to the position of the resonator head 121 of the resonator, such that the distance between the first cover 2 and the resonator head 121 of the resonator 12 will be shortened, because the closer to the resonator 12, and the larger the distributed capacitance, the resonance frequency will be lowered, which can effectively shorten the length of the resonator, thereby reducing the size of the filter and achieving miniaturization of the filter.

A plurality of recesses 22 are formed on the first cover 2 corresponding to the above-mentioned protrusions 21, the arranged positions of the recesses 22 on the first cover 2 correspond to the positions of the resonance tails 123 of the resonators 12, that is, the positions of the lower end surface of the cover where the above-mentioned recesses 22 are arranged are corresponding to the position of the resonant tail 123 of the resonator 12, which will enlarge the space between the resonant tail 123 and the first cover 2, because the farther away from the resonator 12, the greater the inductance, the resonant frequency will be higher, which can shorten the length of the resonator 12, thereby reducing the size of the filter, improving the Q value of the resonator, and reducing the loss.

The shielding wall 23 is arranged between two adjacent resonators 12 to adjust the coupling strength between the two resonators 12, although the coupling strength between the resonators 12 can be determined by the distance between the resonators 12, this method may increase the size of the filter, and the arrangement of the shielding wall 23 does not affect the volume of the filter on the basis of the adjustable coupling between the resonators 12.

The connecting post 24 arranged between two adjacent resonators 12 in the same row connects the first and second covers 2 and 3. The arrangement of the connecting post 24 can improve the harmonic characteristics of the filter. When implemented, the connecting post 24 is arranged on the first cover or the second cover.

In addition, as shown in FIGS. 1 and 2, the frame 6 can also be provided with a plurality of tuning screws 7 passing through the upper end surface of the frame 6 and the lower ends thereof extending above the corresponding resonator 12 for adjusting the resonant frequency of the resonator 12; and a plurality of coupling adjustment screws 8 passing through the upper end surface of the filtering frame 6 and the lower ends thereof extending between two adjacent resonators 12 for adjusting the amount of coupling between the resonators 12.

The signal input port 4 and the signal output port 5 are respectively arranged at the two ends of the above-mentioned signal transmission path, depending on the difference of the signal transmission path, the arranged positions of the signal input port 4 and the signal output port 5 can also be correspondingly different.

The structure of the cross-coupled filter of the present disclosure is described in connection with the following specific embodiments.

Embodiment 1

Figure 3:
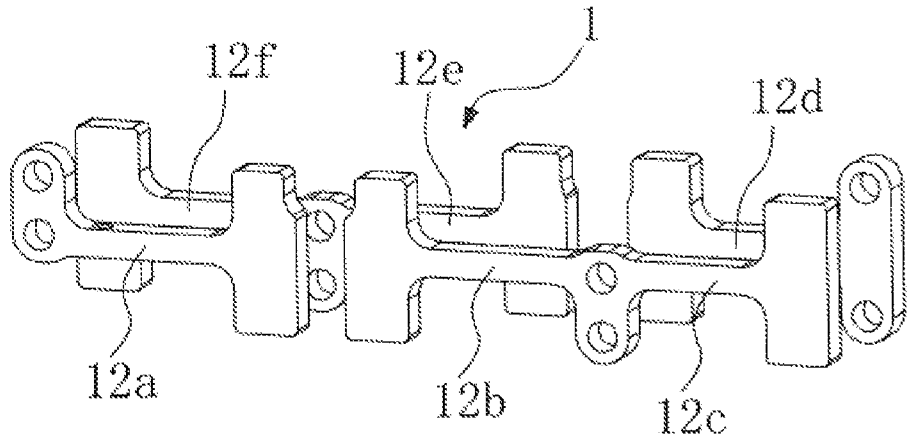
FIG. 3 is a structural diagram of a resonant structure of the filter shown in FIG. 1.

With reference to FIGS. 1 to 3, a cross-coupled filter according to embodiment 1 of the present disclosure includes a resonant structure 1, a first cover 2, and a second cover 3, wherein the first cover 2 and the second cover 3 are respectively covered on the front and rear sides of the frame 6, so that a closed filtering cavity is formed in the frame, and the resonant structure 1 is respectively installed in the frame 6. The structures of the first cover 2 and the second cover 3 can be referred to the above description, and will not be repeated here. The structure of the resonant structure 1 will be described in detail below.

As shown in FIG. 3, the filter formed by the resonant structure 1 of the embodiment 1 of the present disclosure which is a sixth-order filter includes two rows of resonant units arranged on different planes, specifically, the two rows of resonant units are arranged in layers along the front-rear direction of the frame 6. Each row of resonant units is vertically arranged in the frame 6 (that is, up-down direction of the frame 6), and each row of resonant units includes three resonators 12, that is, six resonators 12 are arranged in the frame, for ease of description, these six resonators are respectively defined as resonator 12*a*, resonator 12*b* . . . resonator 12*f*, wherein resonator 12*a*-resonator 12*c* are in a row, and resonator 12*d*-resonator 12*f* are in another row. The structure of each resonator is as described above and will not be repeated here.

The six resonators are arranged in the frame according to a U-shaped signal transmission path. Specifically, the signal is input from the resonator 12*a*, passes through the resonator 12*b* to the resonator 12*e* in turn, and finally output from the resonator 12*f*, that is, the signal input port of the present embodiment 1 is electrically connected to the resonator 12*a*, and the signal output port is electrically connected to the resonator 12*f*.

Among them the capacitive main coupling is formed between the resonator 12*a* and the resonator 12*b* in the same row, and the inductive main coupling is formed between the resonator 12*b* and the resonator 12*c* in the same row, i.e., the alternating coupling of the capacitive main coupling or the inductive main coupling is formed; the capacitive main coupling is formed between the resonator 12*d* and the resonator 12*e* in the same row, and the inductive main coupling is formed between the resonator 12*e* and the resonator 12*f* in the same row, i.e., the alternating coupling of the capacitive main coupling or the inductive main coupling is formed.

Electrical and magnetic hybrid coupling is formed between the resonator 12*a* and the resonator 12*f* in the same column, between the resonator 12*b* and the resonator 12*e* in the same column, and between the resonator 12*c* and the resonator 12*d*. in the same column, the coupling polarity between the resonator 12*a* and the resonator 12*b* in a row (specifically, the capacitive main coupling) is opposite to the coupling polarity between the resonator 12*f* and the resonator 12*e* in another row (specifically, the inductive main coupling), and the coupling polarity between the resonator 12*b* and the resonator 12*c* in two rows is opposite to the coupling polarity between the resonator 12*e* and the resonator 12*d* (specifically, the capacitive main coupling).

Figure 4:
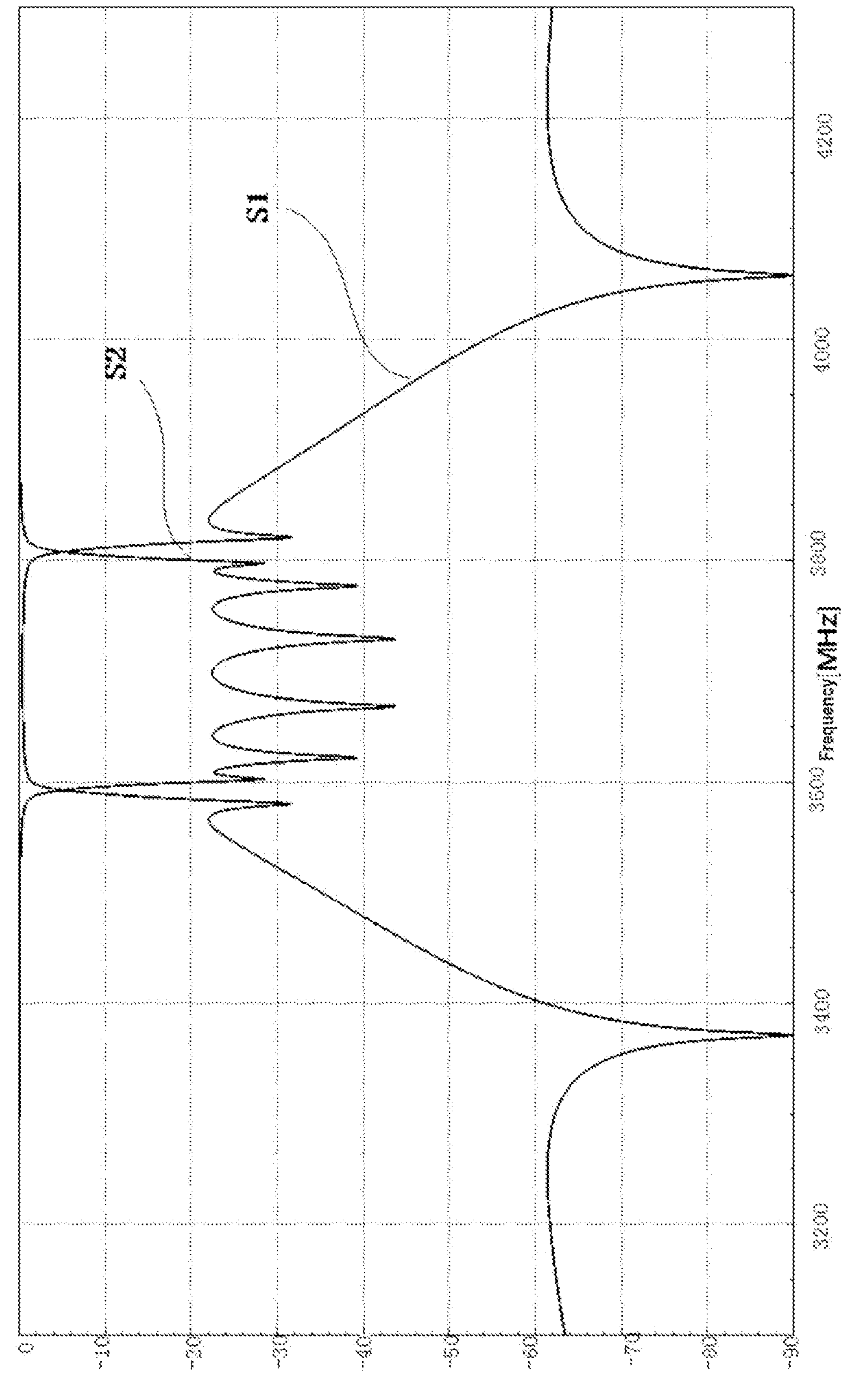
FIG. 4 is a simulated waveform diagram of the filter shown in FIG. 1.

And the cross-coupling (defined as the first cross-coupling) is formed between the resonator 12*b* and the resonator 12*e* in the same column. Cross-coupling (defined as the second cross-coupling) also is formed between the resonator 12*a* and the resonator 12*f* in the same column, that is, two cross-couplings are formed in the filter of the present embodiment 1, each cross-coupling respectively generates a transmission zero point around each side of the bandwidth, thereby generating a total of four transmission zero points, as shown in FIG. 4.

Specifically, the resonance tail of the resonator 12*a* faces the left side wall of the frame 6 and is fixed to the frame by a fixing screw, the resonance head of the resonator 12*a* is opposite to (i.e., face-to-face with) the resonance head of the resonator 12*b*, and the resonance tail of the resonator 12*b* is connected to the resonant tail of the resonator 12*c*, the resonant head of the resonator 12*c* faces the right side wall of the frame 6. The resonance tail of the resonator 12*d* in another row faces the right side wall of the frame 6, and the resonance head of the resonator 12*d* is opposite to (i.e., face-to-face with) the resonance head of the resonator 12*e*, the resonance tail of the resonator 12*e* is connected to the resonance tail of the resonator 12*f*, the resonant head of the resonator 12*f* faces the left side wall of the frame 6. In this way, the resonators 12*a* and 12*f* in the same column, the resonators 12*b* and 12*e* in the same column, and the resonators 12*c* and 12*d* in the same column face the opposite directions.

In some embodiments, the frame 6 is also provided with a partition wall 61 between the two rows of resonant units, and at least one coupling window 62 for generating the coupling between the two rows of resonant units is arranged on the partition wall.

Embodiment 2

As shown in FIG. 5, a cross-coupled filter of an embodiment 2 of the present disclosure is an alternative implementation of the above-mentioned embodiment 1, the filter formed by the resonant structure 1 of the embodiment 2 of the present disclosure is also a sixth-order filter, and the filter also includes two rows of resonant units on different planes, and the resonant units are specifically arranged in layers along the front-rear direction of the frame. Unlike the embodiment 1, the resonator 12*a*, the resonator 12*b*, the resonator 12*f*, and the resonator 12*e* of the embodiment 2 form the minimum resonance structure A described above. In the minimum resonant structure A, the resonator 12*a* and the resonator 12*b* in the same row are capacitively mainly coupled, and the resonator 12*f* and the resonator 12*e* in the same row are inductively mainly coupled, and cross-coupling is formed between the resonator 12*a* and the resonator 12*f*.

Except for the minimum resonant structure A, the coupling mode of other resonators is not limited.

Specifically, the resonant tail of the resonator 12*a* faces the right side wall of the frame 6, the resonant head of the resonator 12*a* is opposite to (i.e., placed face-to-face with) the resonant head of the resonator 12*b*, the resonant tail of the resonator 12*b* is connected to the resonant tail of the resonator 12*c*, and the resonance head of the resonator 12*c* faces the left side wall of the frame 6. The resonant head of the resonator 12*d* faces the left side wall of the frame 6, the resonant tail of the resonator 12*d* is opposite to the resonant head of the resonator 12*e*, the resonant tail of the resonator 12*e* is connected to the resonant tail of the resonator 12*f*, and the resonant head of the resonator 12*f* faces the right side wall of the frame 6.

Embodiment 3

Figure 6:
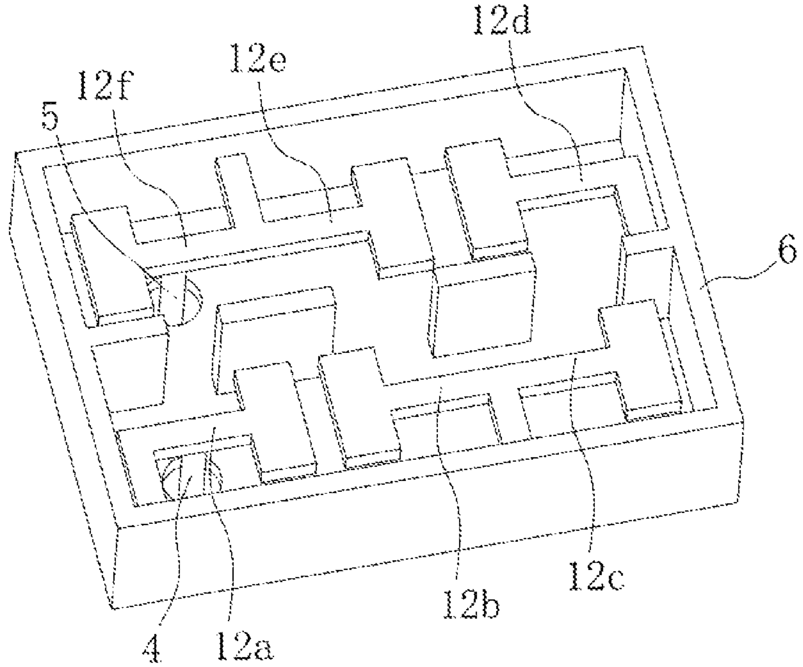
FIG. 6 is a structural diagram of a filter according to embodiment 3 of the present disclosure.

As shown in FIG. 6, a cross-coupled filter of an embodiment 3 of the present disclosure is also an alternative implementation of the embodiment 1 above. Unlike the embodiment 1, the two rows of resonant units in the present embodiment 3 are located on the same plane, and the arrangement and coupling mode of the other six resonators are the same as those of the embodiment 1, and will not be repeated here.

Embodiment 4

A cross-coupled filter according to an embodiment 4 of the present disclosure includes a resonant structure 1, a frame 6, a signal input port 4, and a signal output port 5, wherein the resonant structure 1 is separately and respectively installed in the frame 6. The structure of the resonant structure 1 will be described in detail below.

Figure 7:
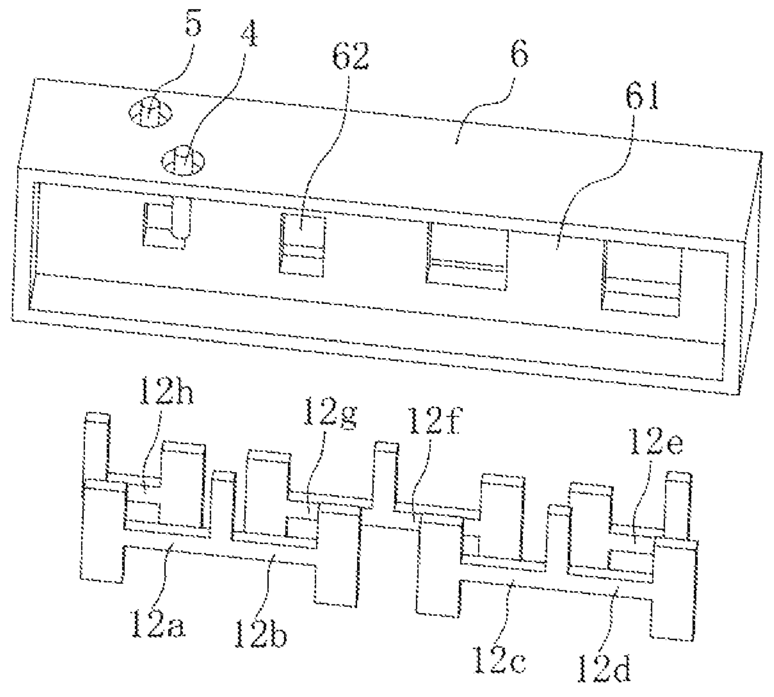
FIG. 7 is a structural diagram of a filter according to embodiment 4 of the present disclosure.

As shown in FIG. 7, the filter formed by the resonant structure 1 of the embodiment 4 of the present disclosure which is an eighth-order filter includes two rows of resonant units on different planes, and the resonant units are specifically along the front-rear direction of the frame 6. Each row of resonant units is arranged vertically in the frame 6 (that is, the up-down direction of the frame 6), and each row of resonant units includes four resonators 12, that is, eight resonators 12 are arranged in the frame 6, for ease of description, these eight resonators are respectively defined as resonator 12*a*, resonator 12*b* . . . resonator 12*h*, wherein resonator 12*a*-resonator 12*d* are in a row, and resonator 12*e*-resonator 12*h* are in a row. The structure of each resonator is as described above and will not be repeated here.

The eight resonators are arranged the frame according to a U-shaped signal transmission path, specifically, the signal is input from the resonator 12*a*, passes through the resonator 12*b* to the resonator 12*g* in turn, and finally outputs from the resonator 12*h*, that is, the signal input port 4 of the present embodiment 4 is electrically connected to the resonator 12*a*, and the signal output port 5 is electrically connected to the resonator 12*h*.

Among them, the inductive main coupling is formed between the resonator 12*a* and the resonator 12*b* in the same row, the capacitive main coupling is formed between the resonator 12*b* and the resonator 12*c* in the same row, and the inductive main coupling is formed between the resonator 12*c* and the resonator 12*d* in the same row, i.e., the alternating coupling of the inductive main coupling or the capacitive main coupling is formed; the capacitive main coupling is formed between the resonator 12*h* and the resonator 12*g* in the same row, the inductive main coupling is formed between the resonator 12*g* and the resonator 12*f* in the same row, and the capacitive main coupling is formed between the resonator 12*f* and the resonator 12*e* in the same row, i.e., the alternating coupling of the capacitive main coupling or the inductive main coupling is formed.

Electrical and magnetic hybrid coupling is formed between the resonator 12*a* and the resonator 12*h* in the same column, between the resonator 12*b* and the resonator 12*g* in the same column, between the resonator 12*c* and the resonator 12*f* in the same column, and between the resonator 12*d* and the resonator 12*e* in the same column respectively, and the coupling polarity between the resonator 12*a* and the resonator 12*b* in two rows (specifically, the inductive main coupling) is opposite to the coupling polarity between the resonator 12*h* and the resonator 12*g* (specifically, the capacitive main coupling), the coupling polarity between the resonator 12*b* and the resonator 12*c* in two rows (specifically the capacitive main coupling) is opposite to the coupling polarity between the resonator 12*g* and the resonator 12*f* (specifically the inductive main coupling), the coupling polarity between the resonator 12*c* and the resonator 12*d* in two rows (specifically the inductive main coupling) is opposite to the coupling polarity between the resonator 12*f* and the resonator 12*e* (specifically the capacitive main coupling).

And the cross-coupling (defined as the first cross-coupling) is formed between the resonator 12*c* and the resonator 12*f* in the same column. The cross-coupling (defined as the second cross-coupling) is also formed between the resonator 12*b* and the resonator 12*g* in the same column. The cross-coupling (defined as the third cross-coupling) is also formed between the resonator 12*a* and the resonator 12*h* in the same column, that is, three cross-couplings are formed in the filter of the present embodiment 4, and each cross-coupling respectively generates a transmission zero point around each side of the bandwidth, thereby generating a total of six transmission zero points, as shown in FIG. 7.

Specifically, the resonant head of the resonator 12*a* faces the left side wall of the frame 6, the resonant tail of the resonator 12*a* is connected to the resonant tail of the resonator 12*b*, the resonant head of the resonator 12*b* is opposite to the resonant head of the resonator 12*c*, and the resonator tail of the resonator 12*d* is connected to the resonant tail of the resonator 12*d*, and the resonant head of the resonator 12*d* faces the right side wall of the frame 6. The resonance tail of the resonator 12*e* in another row faces the right side wall of the frame 6, and the resonance head of the resonator 12*e* is opposite to the resonance head of the resonator 12*f*, the resonance tail of the resonator 12*f* is connected to the resonance tail of the resonator 12*g*, the resonant head of the resonator 12*g* is opposed to the resonant head of the resonator 12*h*, and the resonator 12*h* faces the left side wall of the frame 6. In this way, the resonators 12*a* and 12*h* in the same column, the resonators 12*b* and 12*g* in the same column, the resonators 12*c* and 12*f* in the same column, and the resonators 12*d* and 12*e* in the same column face the opposite directions.

Similarly, In some embodiments, a partition wall 6 located between the two rows of resonant units is further arranged in the frame 6, and at least one coupling window 61 for generating the coupling between the two rows of resonant units is arranged on the partition wall 6.

Embodiment 5

As shown in FIG. 8, a cross-coupled filter of an embodiment 5 of the present disclosure is an alternative implementation of the above-mentioned embodiment 4, the filter formed by the resonant structure 1 of the embodiment 4 of the present disclosure is also an eighth-order filter, and the resonant structure 1 also includes two rows of resonant units on different planes, and are specifically arranged in layers along the front-rear direction of the frame. Unlike the embodiment 4, the resonator 12*a*, the resonator 12*b*, the resonator 12*h*, and the resonator 12*g* in the embodiment 5 form the minimum resonant structure A described above. In the minimum resonant structure A, the resonator 12*a* and the resonator 12*b* in the same row are capacitively mainly coupled, and the resonator 12*h* and the resonator 12*g* in the same row are inductively mainly coupled.

Except for the minimum resonant structure A, the resonator 12*c* and the resonator 12*d* in the same row are capacitively mainly coupled, the resonator 12*f* and the resonator 12*e* in the same row are capacitively mainly coupled; the resonators 12*f* and the resonator 12*g* in the same row are electrically and magnetically hybrid coupled, and the resonator 12*b* and the resonator 12*c* in the same row are inductively mainly coupled.

Specifically, the resonant tail of the resonator 12*a* faces the left side wall of the frame 6, the resonant head of the resonator 12*a* is opposite to the resonant head of the resonator 12*b*, the resonant tail of the resonator 12*b* is connected to the resonant tail of the resonator 12*c*, and the resonance head of the resonator 12*c* is opposed to the resonant head of the resonator 12*d*, and the resonator 12*d* faces the right side wall of the frame 6. The resonant head of the resonator 12*e* faces the right side wall of the frame 6, the resonant head of the resonator 12*e* is opposed to the resonant head of the resonator 12*f*, the resonant tail of the resonator 12*f* is opposed to the resonant head of the resonator 12*g*, and the resonant tail of the resonator 12*g* is connected to the resonance tail of the resonator 12*h*, and the resonance tail of the resonator 12*h* faces the left side wall of the frame 6.

Embodiment 6

As shown in FIG. 9, a cross-coupled filter of an embodiment 6 of the present disclosure is an alternative implementation of the embodiment 5 above. Unlike the embodiment 5, the two rows of resonant units in the embodiment 6 are located on the same plane, and the arrangement structure and coupling mode of the other six resonators are the same as those of the embodiment 1, and will not be repeated here.

Embodiment 7

Figure 10:
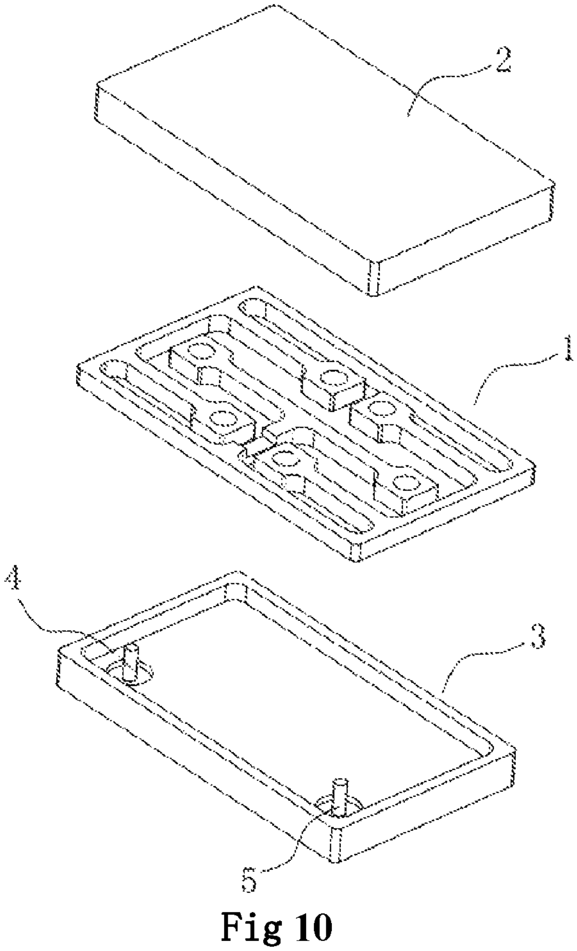
FIG. 10 is an exploded view of a filter according to embodiment 7 of the present disclosure.

As shown in FIGS. 10 to 12, a cross-coupled filter according to the embodiment 7 of the present disclosure includes a resonant structure, and the resonant structure 1 is an integrated frame structure. The structure of the resonant structure 1 will be described in detail below.

The filter formed by the resonant structure 1 of the embodiment 7 of the present disclosure which is a sixth-order filter includes a frame 6 and three rows of resonant units integrally formed in the frame 6, and each row of resonant units includes two resonators 12, that is, six resonators 12 are arranged in the frame, for ease of description, the six resonators are defined as resonator 12*a*, resonator 12*b* . . . resonator 12*f*, wherein the resonator 12*a* and the resonator 12*f* are in a row, and the resonator 12*b* and the resonator 12*e* is in a row, and the resonator 12*c* and the resonator 12*d* are in a row. The structure of each resonator is as described above and will not be repeated here.

The three rows of resonators 12 are distributed in the frame along the front-back directions where the front and back side walls of the frame 6 are located. And the six resonators are arranged in the frame according to the U-shaped signal transmission path, specifically, the signal is input from the resonator 12*a*, and passes through the resonator 12*b* to the resonator 12*e* in turn, finally outputs from the resonator 12*f*. The signal input port of the present embodiment 1 is electrically connected to the resonator 12*a*, and the signal output port is electrically connected to the resonator 12*f*.

Figure 13:
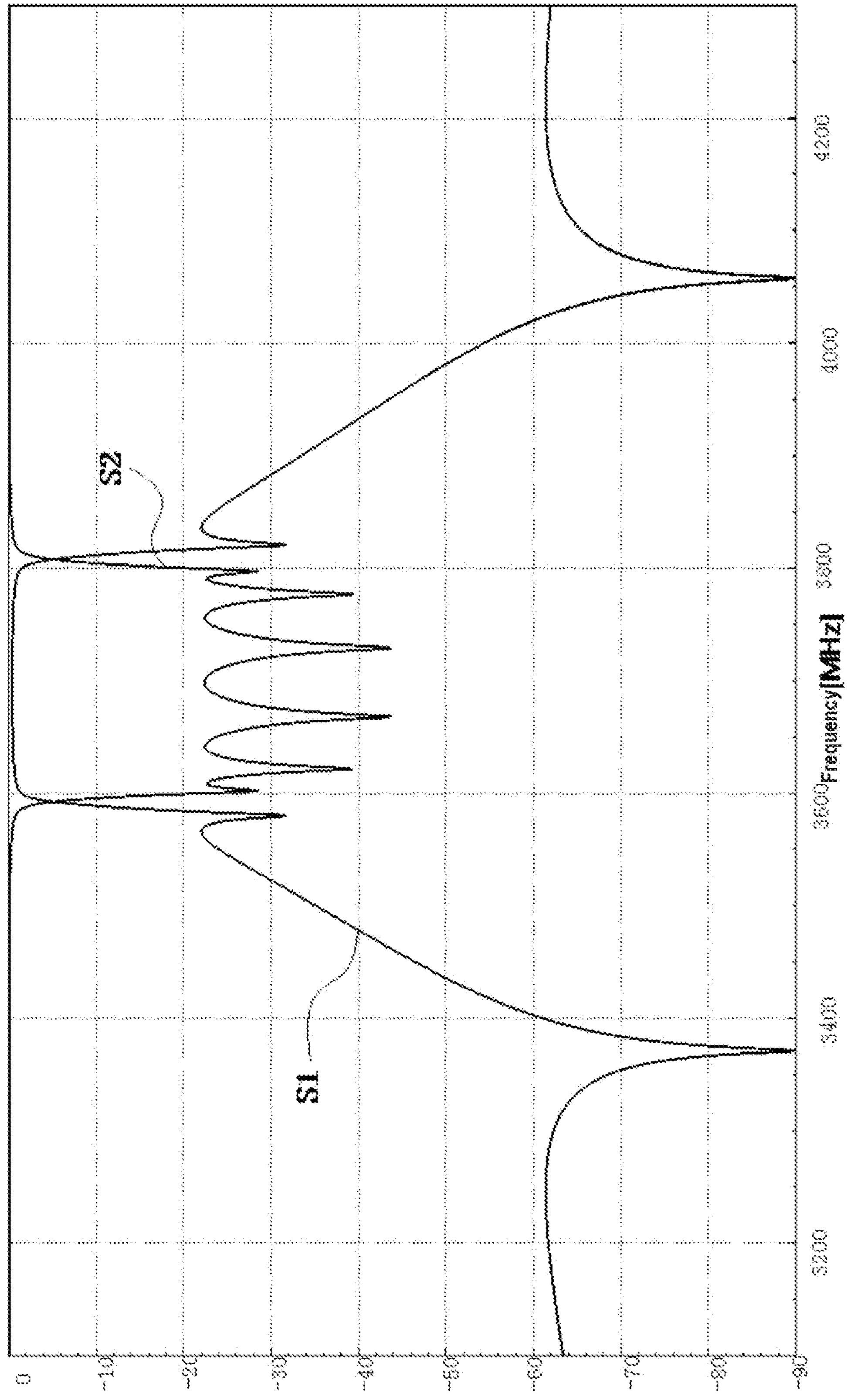
FIG. 13 is a simulated waveform diagram of the filter according to embodiment 7 of the present disclosure.

Among them, the electrical and magnetic hybrid coupling is formed between the resonator 12*a* and the resonator 12*b* in the same column, the electrical and magnetic hybrid coupling is formed between the resonator 12*b* and the resonator 12*c* in the same column, the capacitive main coupling is formed between the resonator 12*c* and the resonator 12*d* in the same column, and the capacitive main coupling is formed between the resonator 12*d* and the resonator 12*e* in the same column, the capacitive main coupling is formed between the resonator 12*e* and the resonator 12*f* in the same column and the cross-coupling (defined as the first cross-coupling) is generated between the resonator 12*d* and the resonator 12*e* in the same row is the inductive main coupling which is opposite to the capacitive main coupling formed between the resonator 12*c* and the resonator 12*d*, the cross-coupling (defined as the second cross-coupling) is formed between the resonators 12*a* and 12*f* in the same row is capacitive main coupling which is opposite to the inductive main coupling formed between the resonator 12*b* and the resonator 12*e*, that is, the resonator 12*c* and the resonator 12*d* are capacitively mainly coupled, the resonator 12*b* and the resonator 12*e* are inductively mainly coupled, and the resonators 12*a* and 12*f* are capacitively mainly coupled, i.e., the alternating coupling of the capacitive main coupling or the inductive main coupling is formed. The present embodiment 1 forms two cross-couplings, and each cross-coupling respectively generates a transmission zero point around each side of the bandwidth, thereby generating a total of four transmission zero points, as shown in FIG. 13.

Specifically, the resonant tail 123 of the resonator 12*a* is integrally formed with the left side wall of the frame 6, and the resonant head 121 of the resonator 12*a* is opposite to the resonant head 121 of the resonator 12*f*, and there is a coupling gap between the resonant heads 121 of the resonators 12*a* and 12*f*; the resonant tail 123 of the resonator 12*f* is integrally formed with the right side wall of the frame 6; the resonant tails 123 of the resonators 12*b* and 12*e* are connected and integrally formed with the rear side wall of the frame 6, and a coupling window is arranged on the connection part connecting the resonators 12*b* and 12*e* to the rear side wall of the frame 6 for generating the cross-coupling between the resonator heads 121 of the resonators 12*a* and 12*f*, the two resonator head 121 face the left and right side walls of the frame 6 respectively, and not in contact with the left or right side walls; the resonant tail 123 of the resonator 12*c* is integrally formed with the left wall of the frame 6, and the resonant head 121 of the resonator 12*c* is opposite to the resonant head 121 of the resonator 12*d*, and there is a coupling gap between the resonant heads 121 of the resonators 12*c* and 12*d*, and the resonant tail 123 of the resonator 12*d* is integrally formed with the right side wall of the frame 6.

In some embodiments, to increase the amount of the cross-coupling between the resonator 12*a* and the resonator 12*f*, the above-mentioned additional structural member connecting the resonator 12*a* and the resonator 12*f* may be added to increase the amount of the coupling between the resonator 12*a* and the resonator 12*f* according to the condition.

Embodiment 8

Figure 14:
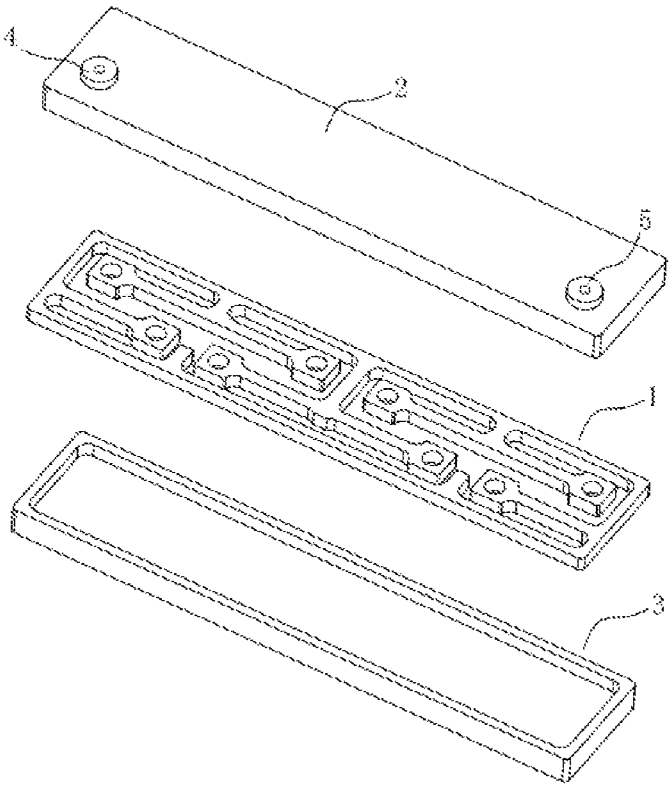
FIG. 14 is an exploded view of a filter according to embodiment 8 of the present disclosure.

With reference to FIGS. 14 and 15, a cross-coupled filter of an embodiment 8 of the present disclosure includes a resonant structure 1, a top cover 2, a bottom cover 3, a signal input port 4, and a signal output port 5, wherein the filter formed by the resonant structure of the embodiment 5 of the invention is an eighth-order filter, includes a frame 6 and two rows of resonant units integrally formed in the frame 6, and each row of resonant units includes four resonators, that is, eight resonators are arranged in the frame, as shown in FIG. 15, similarly, for ease of description, these eight resonators are defined as resonator 12*a*, resonator 12*b* . . . resonator 12*h*, wherein resonator 12*a*, resonator 12*d*, resonator 12*e* and the resonator 12*h* are in a row, and the resonator 12*b*, the resonator 12*c*, the resonator 12*f*, and the resonator 12*g* are in a row. The structure of each resonator is as described above and will not be repeated here.

Two rows of resonators are distributed in the frame along the front-back direction where the front and back side walls of the frame are located. And the eight resonators are arranged in the frame according to a plurality of continuous S-shaped signal transmission paths, specifically, the signal is input from the resonator 12*a*, passes through the resonator 12*b* to the resonator 12*g*, and finally outputs from the resonator 12*h*, in other words, the signal input port of the embodiment 5 is electrically connected to the resonator 12*a*, and the signal output port is electrically connected to the resonator 12*h*.

Figure 16:
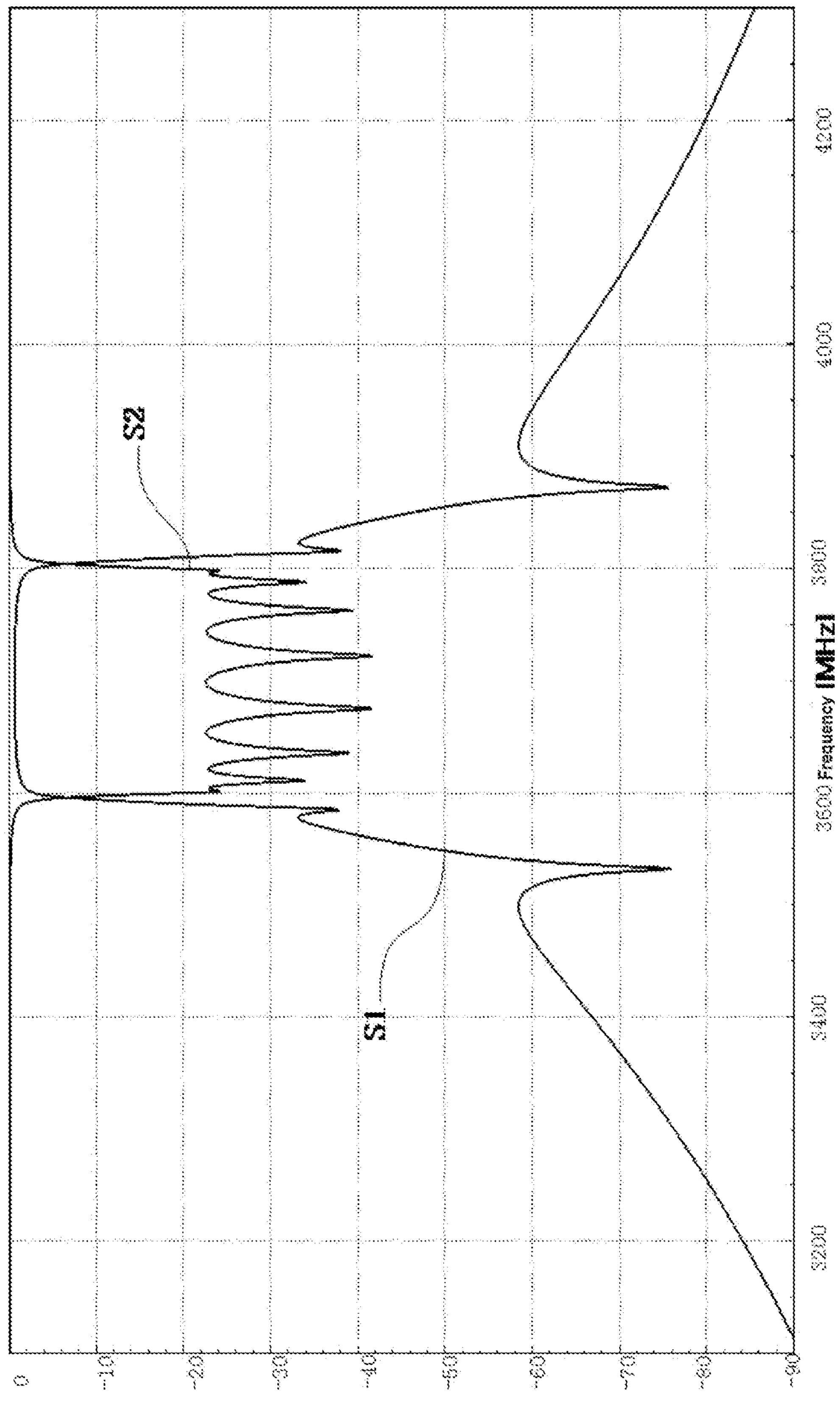
FIG. 16 is a simulated waveform diagram of the filter according to embodiment 8 of the present disclosure.

Among them, the electrical and magnetic hybrid coupling is formed between the resonator 12*a* and the resonator 12*b* in the same column, the electrical and magnetic hybrid coupling is formed between the resonator 12*c* and the resonator 12*d* in the same column, the electrical and magnetic hybrid coupling is formed between the resonator 12*e* and the resonator 12*f* in the same column, and the electrical and magnetic hybrid coupling is formed between the resonator 12*g* and the resonator 12*h* in the same column. the inductive main coupling is formed between the resonator 12*b* and the resonator 12*c* in the same row, and the cross-coupling (defined as the first cross-coupling) generated between the resonator 12*a* and the resonator 12*d* is capacitive main coupling which is opposite to the inductive main coupling formed between the resonator 12*b* and the resonator 12*c*; the inductive main coupling is formed between the resonators 12*f* and 12*g* in the same row, and the cross-coupling (defined as the second cross-coupling) generated between resonator 12*e* and resonator 12*h* is capacitive main coupling which is opposite to the inductive main coupling formed between the resonator 12*f* and the resonator 12*g*. That is, resonator 12*b* and resonator 12*c* are inductively mainly coupled, resonator 12*a* and resonator 12*d* are capacitively mainly coupled, resonator 12*d* and resonator 12*e* are inductively mainly coupled, resonator 12*c* and resonator 12*f* are capacitively mainly coupled, resonator 12*f* and resonator 12*g* are inductively mainly coupled, and resonator 12*e* and resonator 12*h* are capacitively mainly coupled, i.e., the alternating coupling of the inductive main coupling or the capacitive main coupling is formed. The present embodiment 8 forms two cross-couplings, and each cross-coupling respectively generates a transmission zero point around each side of the bandwidth, thereby generating a total of four transmission zero points, as shown in FIG. 16.

Specifically, the resonant tail 123 of the resonator 12*a* is integrally formed with the left side wall of the frame 6, the resonant head 121 of the resonator 12*a* is opposite to the resonant head 121 of the resonator 12*d*, and there is a coupling gap between the two resonant heads 121, and a shielding wall for adjusting the amount of electrical coupling between the resonator 12*a* and the resonator 12*d* is also arranged between the two resonant heads 121 of the resonators 12*a* and 12*d*. The resonant heads 121 of the resonators 12*b* and 12*c* are connected and integrally formed with the front side wall of the frame 6, and the resonant heads 121 of the resonators 12*b* and 12*c* face the opposite directions. The resonant tails 123 of the resonators 12*d* and 12*e* are connected and are integrally formed with the front side wall of the frame 6, and the resonant heads 123 of the resonators 12*d* and 12*e* face the opposite directions. The resonant heads 121 of the resonators 12*c* and 12*f* are opposed to each other, and are separated by the connection part connecting the resonator 12*d* and the resonator 12*e* to the front side wall of the frame 6. The resonant tails 123 of the resonators 12*f* and 12*g* are connected and are integrally formed with the front side wall of the frame 6, and the resonant heads 121 of the resonators 12*g* and 12*f* face the opposite directions. The resonant head 121 of the resonator 12*e* is opposite to the resonant head 121 of the resonator 12*h*, and there is a coupling gap between the resonant heads 121 of the resonators 12*e* and 12*h*, and a shielding wall 23 is arranged between the resonant head 121 of the resonators 12*e* and 12*h* to adjust the amount of the electrical coupling between the resonant heads 121 of the resonators 12*e* and 12*h*.

Embodiment 9

Figure 19A:
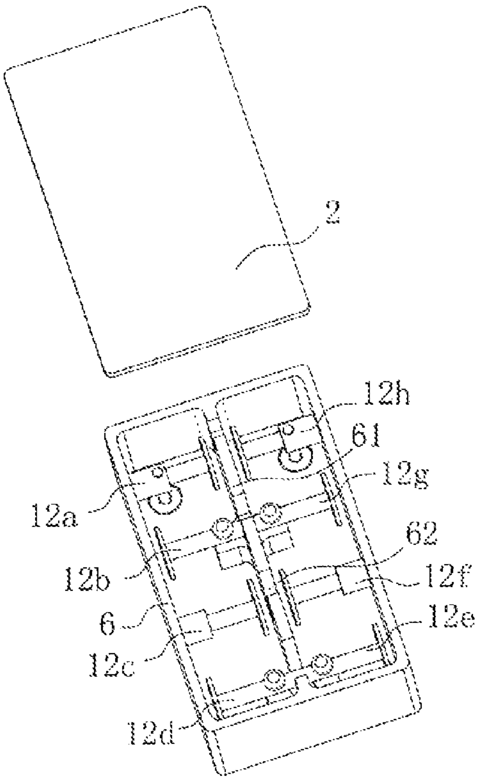
Figure 19B:
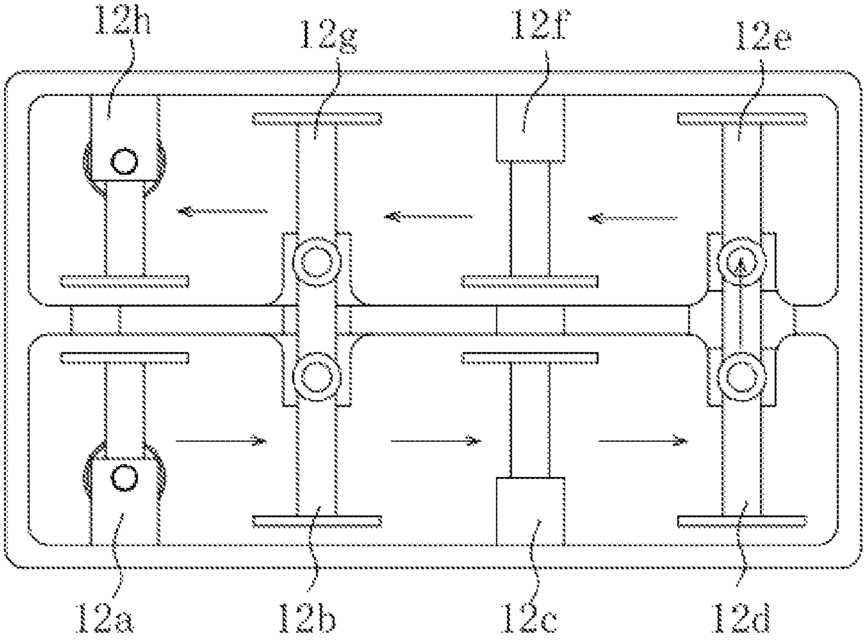

As shown in FIGS. 19*a* and 19*b*, a cross-coupled filter according to an embodiment 9 of the present disclosure includes a resonant structure 1, a first cover 2 and a frame 6, wherein the first cover 2 covers the front and rear sides of the frame 6, so that a closed filter cavity is formed in the frame 6, and the resonant structure 1 is respectively installed in the frame 6. The structure of the resonant structure 1 will be described in detail below.

As shown in FIG. 19*b*, the filter formed by the resonant structure 1 of the embodiment 9 of the present disclosure which is an eighth-order filter includes two rows of resonant units on the same plane, the two rows of resonant units are specifically arranged along the front-rear direction of the frame 6. Each row of resonant units includes four resonators 12, that is, eight resonators 12 are arranged in the frame, for ease of description, these eight resonators are defined as resonators 12*a*, resonators 12*b* . . . resonators 12*h*, wherein the resonators 12*a*-resonators 12*d* are in a row, and resonators 12*e*-resonators 12*h* are in a row. The structure of each resonator is as described above and will not be repeated here.

The eight resonators are arranged in the frame according to a U-shaped signal transmission path, specifically, the signal is input from the resonator 12*a*, passes through the resonator 12*b* to the resonator 12*g* in turn, and finally outputs from the resonator 12*h*, that is, the signal input port of the present embodiment 9 is electrically connected to the resonator 12*a*, and the signal output port is electrically connected to the resonator 12*h*.

Among them, the capacitive main coupling is formed between the resonator 12*a* and the resonator 12*h* in the same column, and the inductive main coupling is formed between the resonator 12*b* and the resonator 12*g*, i.e., the alternating coupling of the capacitive main coupling or the inductive main coupling is formed; the capacitive main coupling is formed between the resonator 12*c* and the resonator 12*f* in the same column, and the inductive main coupling is formed between the resonator 12*d* and the resonator 12*e*, that is, the alternating coupling of the capacitive main coupling or the inductive main coupling is formed.

The electrical and magnetic hybrid coupling is formed between the resonator 12*a* and the resonator 12*b* in the same row, the electrical and magnetic hybrid coupling is formed between the resonator 12*b* and the resonator 12*c*, the electrical and magnetic hybrid coupling is formed between the resonator 12*c* and the resonator 12*d*, and the coupling polarity (specifically, the capacitive main coupling) between the resonator 12*a* and the resonator 12*h* in two columns is opposite to the coupling polarity (specifically, the inductive main coupling) between the resonator 12*b* and resonator 12*g*, the coupling polarity (specifically, the capacitive main coupling) between the resonators 12*c* and 12*f* in two columns is opposite to the coupling polarity (specifically, the inductive main coupling) between the resonator 12*d* and the resonator 12*e*.

Figure 19C:
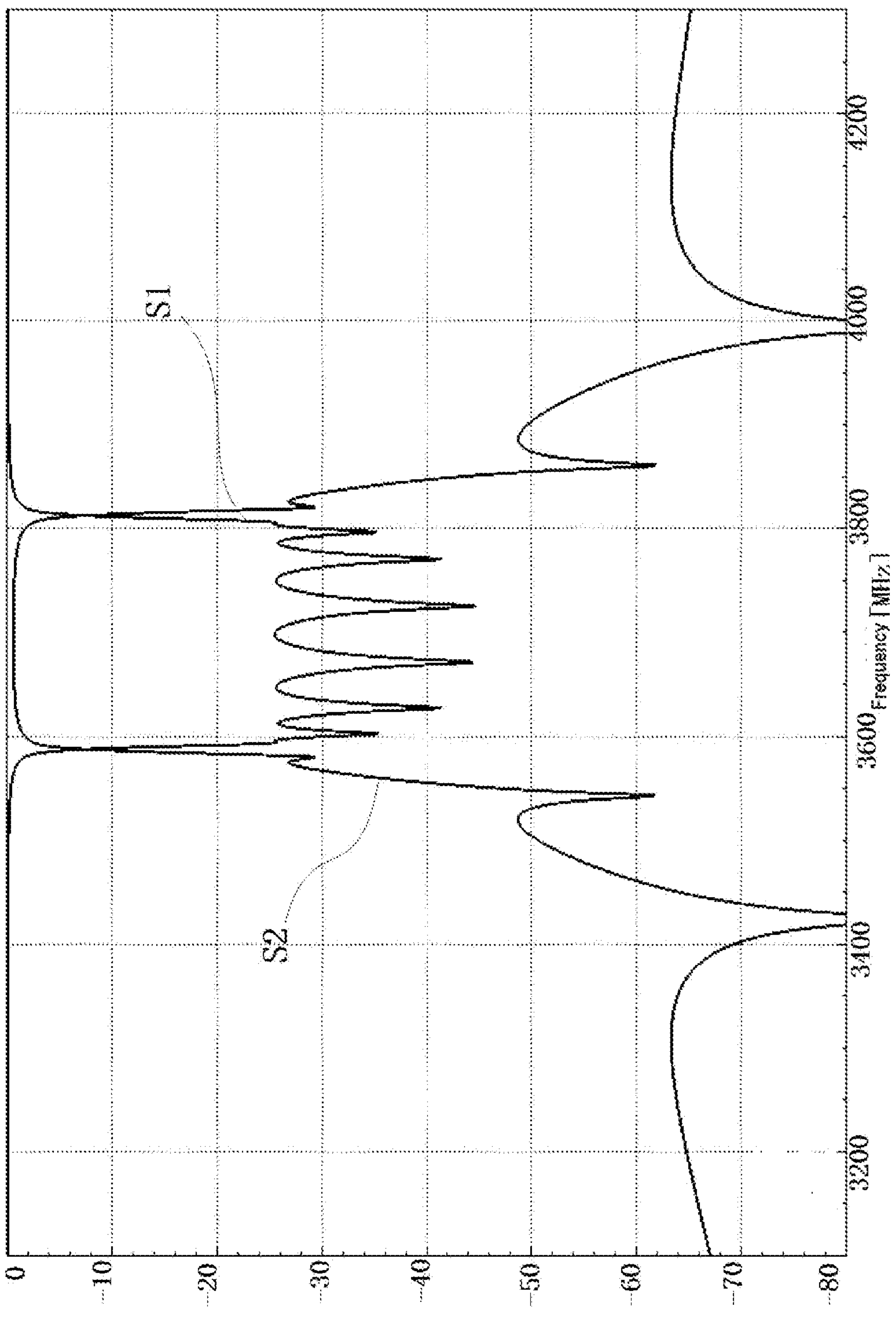

And the cross-coupling (defined as the first cross-coupling) is formed between the resonator 12*c* and the resonator 12*f* in the same column. The cross-coupling (defined as the second cross-coupling) also is formed between the resonator 12*b* and the resonator 12*g* in the same column, and the cross-coupling (defined as the third cross-coupling) also is formed between the resonator 12*a* and the resonator 12*h* in the same column, that is, three cross-couplings are formed in the filter of the present embodiment 9, and each cross-coupling respectively generates a transmission zero point around each side of the bandwidth, thereby generating a total of six transmission zero points, as shown in FIG. 19*c*.

Specifically, the resonance tail of the resonator 12*a* faces the rear side wall of the frame 6 and is fixed to the frame by a fixing screw, the resonance head of the resonator 12*a* is opposite to the resonance head of the resonator 12*h*, and the resonance tail of the resonator 12*h* faces the front side wall of the frame 6, and is fixed to the frame by a fixing screw; the resonant head of the resonator 12*b* faces the rear side wall of the frame 6, the resonant tail of the resonator 12*b* is connected to the resonant tail of the resonator 12*g*, and the resonant head of the resonator 12*g* faces the front side wall of the frame 6. The resonant tail of the resonator 12*c* is fixed on the rear side wall of the frame 6, the resonant head of the resonator 12*c* is opposite to the resonant head of the resonator 12*f*, and the resonant tail of the resonator 12*f* is fixed on the front side wall of the frame 6; the resonance tail of the resonator 12*d* is connected to the resonant tail of the resonator 12*e*, and the resonant heads of the resonators 12*d* and 12*e* face the rear side wall and the front side wall of the frame 6, respectively. In this way, the resonators 12*a* and 12*b* in the same row face the opposite directions, the resonators 12*b* and 12*c* in the same row face the opposite directions, the resonators 12*c* and the resonators 12*d* in the same row face the opposite directions; the resonators 12*e* and 12*f* in the same row face the opposite directions, the resonators 12*f* and the resonators 12*g* in the same row face the opposite directions, the resonator 12*g* and the resonator 12*h* in the same row face the opposite directions.

In some embodiments, the frame 6 is also provided with a partition wall 61 between the two rows of resonant units, and at least one coupling window 62 for generating the coupling between the two rows of resonant units is arranged on the partition wall.

In addition to the filters with six resonators and eight resonators described in the foregoing embodiments 1 to 8, the present disclosure is applicable to any fourth-order r above fourth-order filter.

The technical content and technical features of the present disclosure have been disclosed as above, but those skilled in the art may still make various substitutions and modifications based on the teaching and disclosure of the present disclosure without departing from the spirit of the present disclosure. Therefore, the protection scope of the present disclosure should not be limited in the content disclosed in the embodiments, but should include various substitutions and modifications that do not deviate from the present disclosure, and are covered by the claims of this patent application.

The invention claimed is:

1. A cross-coupled filter, comprising:

a resonant structure including at least two rows of resonant units and at least two columns of resonant units, each row of resonant units and each column of resonant units include at least two resonators respectively, wherein two first adjacent resonators in a first row of the two adjacent rows of resonant units and two second adjacent resonators in a second row of the two adjacent rows of resonant units respectively in the same columns as the two first adjacent resonators form a minimum resonant structure, in the minimum resonant structure, two resonators in the same row form a group, and the two resonators in the same row are capacitively mainly coupled or inductively mainly coupled; the two resonators in the same column are electrically and magnetically hybrid coupled; and coupling polarities of the two groups of resonators of the two rows of resonant units are opposite to each other to form at least a cross-coupling, a coupling polarity including the capacitive main coupling or the inductive main coupling.

2. The cross-coupled filter according to claim 1, wherein in the resonant structure, two adjacent resonators in the same row are capacitively mainly coupled or inductively mainly coupled; two adjacent resonators in the same column are electrically and magnetically hybrid coupled, and the coupling polarities of the adjacent two groups of resonators in the same row are opposite to each other to form at least a cross-coupling.

3. The cross-coupled filter according to claim 1, wherein in the resonant structure, two adjacent resonators in the same row are capacitively mainly coupled or inductively mainly coupled; two adjacent resonators in the same column are electrically and magnetically hybrid coupled, and the coupling polarities of the adjacent two groups of resonators in two adjacent rows are opposite to each other to form at least a cross-coupling.

4. The cross-coupled filter according to claim 1, wherein a plurality of rows of the resonant units are located on the same plane.

5. The cross-coupled filter according to claim 1, wherein a plurality of rows of the resonant units are arranged in layers.

6. The cross-coupled filter according to claim 1, wherein each resonator includes a resonant head and a resonant tail disposed opposite to each other, and a width of the resonant head is greater than a width of the resonator tail.

7. The cross-coupled filter according to claim 6, further comprising:

a cover arranged on the resonant structure, the cover comprises a plurality of protrusions and at least one shielding wall, wherein, the protrusions are formed by extending from an end face of the cover close to the resonant structure toward the resonant structure, and positions of the protrusions arranged on the cover correspond to positions of the resonant heads of the resonators on the resonant structure; and the shielding wall is located between two adjacent resonators.

8. The cross-coupled filter according to claim 6, wherein the resonant tails of two adjacent resonators in the same row are connected or placed face-to-face to form the inductive main coupling, or the resonant heads are placed face-to-face to form the capacitive main coupling;

two adjacent resonators in the same column are arranged in parallel or approximately parallel, and the electrical and magnetic hybrid coupling is formed between the two adjacent resonators in the same column.

9. The cross-coupled filter according to claim 8, wherein coupling polarities of two adjacent groups of resonators in two adjacent rows alternate between the capacitive main coupling and the inductive main coupling.

10. The cross-coupled filter according to claim 8, wherein coupling polarities of a plurality of groups of resonators in the same row alternate between the capacitive main coupling and the inductive main coupling.

11. The cross-coupled filter according to claim 1, wherein the resonant structure further comprises a frame, and the resonant units are integrally formed on the frame.

12. The cross-coupled filter according to claim 1, wherein the resonant structure further comprises a frame, and the resonant units are assembled on the frame.

13. The cross-coupled filter according to claim 1, wherein the cross-coupled filter further comprises at least one structural member configured to enhance an amount of the cross-coupling between the resonators, and the structural member is configured to connect two resonators that form the cross-coupling.

14. The cross-coupled filter according to claim 13, further comprising:

a plurality of tuning screws, each located above a corresponding resonator and configured to adjust a resonant frequency of the corresponding resonator; and a plurality of coupling adjustment screws each located between two adjacent resonators and configured to adjust an amount of coupling between the two adjacent resonators.

15. The cross-coupled filter according to claim 1, wherein:

at least two resonators of the resonant structure are integrally formed.

16. The cross-coupled filter according to claim 1, wherein:

the plurality of rows of resonant units are distributed along a signal transmission path, and the signal transmission path is a U-shaped path, an S-shaped path, or a curved path formed by one or more continuous U-shapes or continuous S-shapes.

17. The cross-coupled filter according to claim 16, further comprising:

a signal input port and a signal output port respectively arranged at two ends of the signal transmission path.

18. The cross-coupled filter according to claim 1, wherein: an order of the cross-coupled filter is at least four.

* * * * *